US012633590B2

(12) United States Patent
Hickey et al.

(10) Patent No.: US 12,633,590 B2
(45) Date of Patent: May 19, 2026

(54) HEAT-SINK WITH VARIABLE CROSS-SECTION COOLANT CHANNELS

(71) Applicant: GM GLOBAL TECHNOLOGY OPERATIONS LLC, Detroit, MI (US)

(72) Inventors: Ryan P. Hickey, Austin, TX (US); Kuo Sun, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 687 days.

(21) Appl. No.: 18/097,646

(22) Filed: Jan. 17, 2023

(65) Prior Publication Data

US 2024/0243383 A1 Jul. 18, 2024

(51) Int. Cl.
*H01M 10/653* (2014.01)
*B60L 50/60* (2019.01)
*B60L 58/26* (2019.01)
*H01M 10/613* (2014.01)
*H01M 10/625* (2014.01)
(Continued)

(52) U.S. Cl.
CPC ........... *H01M 10/653* (2015.04); *B60L 50/60* (2019.02); *B60L 58/26* (2019.02); *H01M 10/613* (2015.04); *H01M 10/625* (2015.04); *H01M 10/6556* (2015.04); *H01M 10/6568* (2015.04); *H01M 2220/20* (2013.01)

(58) Field of Classification Search
CPC ............. H01M 10/653; H01M 10/613; H01M 10/625; H01M 10/6556; H01M 10/6568; H01M 2220/20; H01M 10/6557; H01M 10/6567; H01M 10/63; H01M 10/658; B60L 50/60; B60L 58/26; B60L 50/64; Y02E 60/10
See application file for complete search history.

(56) References Cited

U.S. PATENT DOCUMENTS 8,846,232 B2 * 9/2014 Tse ...................... H01M 10/613
429/90
2011/0229749 A1 * 9/2011 Kim .................... H01M 10/486
429/120
(Continued)

FOREIGN PATENT DOCUMENTS

AU 2021231049 A1 * 4/2022 .......... H01M 50/507
DE 102020125657 A1 4/2022
(Continued)

*Primary Examiner* — Muhammad S Siddiquee
(74) *Attorney, Agent, or Firm* — Quinn IP Law

(57) ABSTRACT

A battery module includes a first battery cell and a neighboring second battery cell. The battery module also includes a heat-sink configured to absorb thermal energy from each of the battery cells. The heat-sink includes first and second coolant channels, each associated with and arranged proximate a corresponding first or second battery cell, configured to receive coolant, and defined by a respective cross-sectional area. Each coolant channel cross-sectional area is configured to selectively vary in response to a change in temperature of the associated first or second battery cell. The coolant channel variable cross-sectional areas are configured to bias cooling to a region of the heat-sink proximate to the battery cell experiencing a thermal runaway event and control propagation of the thermal runaway event to the other battery cell.

20 Claims, 3 Drawing Sheets

(51) Int. Cl.
 *H01M 10/6556* (2014.01)
 *H01M 10/6568* (2014.01)

(56) References Cited

U.S. PATENT DOCUMENTS

2021/0126301 A1* 4/2021 Butterfield ............ H01M 50/30
2021/0143497 A1* 5/2021 Günther ............ H01M 10/6557

FOREIGN PATENT DOCUMENTS

DE 102021100715 A1 7/2022
DE 102023101013 A1 * 2/2024 ........ H01M 10/6554

* cited by examiner 34-1, 34-2

42-1, 42-2

46-1, 46-2

44-1, 44-2

50

48-1, 48-2

34-1, 34-2

44-1, 44-2

42-1, 42-2

46-1, 46-2

52

48-1, 48-2

HEAT-SINK WITH VARIABLE CROSS-SECTION COOLANT CHANNELS

INTRODUCTION

The present disclosure relates to a heat-sink or cold plate with variable cross-sectional area coolant channels for heat removal and thermal runaway event mitigation in a battery module.

A battery module or array may include a plurality of battery cells in relatively close proximity to one another. Batteries may be broadly classified into primary and secondary batteries. Primary batteries, also referred to as disposable batteries, are intended to be used until depleted, after which they are simply replaced with new batteries. Secondary batteries, more commonly referred to as rechargeable batteries, employ specific chemistries permitting such batteries to be repeatedly recharged and reused, therefore offering economic, environmental and ease-of-use benefits compared to disposable batteries.

Rechargeable batteries may be used to power such diverse items as toys, consumer electronics, and motor vehicles. Particular chemistries of rechargeable batteries, such as lithium-ion cells, as well as external factors, may cause internal reaction rates generating significant amounts of thermal energy. Such chemical reactions may cause more heat to be generated by the batteries than is effectively withdrawn. Exposure of a battery cell to elevated temperatures over prolonged periods may cause the cell to experience a thermal runaway event. Accordingly, a thermal runaway event starting within an individual cell may lead to the heat spreading to adjacent cells in the module and cause the thermal runaway event to affect the entire battery array.

SUMMARY

A battery module includes a first battery cell and a neighboring second battery cell. The battery module also includes a heat-sink configured to absorb thermal energy from the first and second battery cells. The heat-sink includes a first coolant channel arranged proximate and associated with the first battery cell, configured to receive coolant, and defined by a first cross-sectional area. The heat-sink also includes a second coolant channel arranged proximate and associated with the second battery cell, configured to receive coolant, and defined by a second cross-sectional area. Each of the first and second coolant channel cross-sectional areas is configured to selectively vary (increase/decrease) in response to a change in temperature of the associated first or second battery cell. The coolant channel variable cross-sectional areas are configured to bias cooling to a region of the heat-sink proximate to the battery cell experiencing a thermal runaway event and control propagation of the thermal runaway event to the other battery cell.

When a temperature of the first battery cell or the second battery cell is below a predetermined value indicative of the thermal runaway event, the corresponding first or second coolant channel cross-sectional areas may be defined by a respective first or second restrictor having a corresponding restrictor cross-section projecting into the associated coolant channel and thereby limiting the respective first or second coolant channel cross-sectional area. On the other hand, when the temperature of the first battery cell or the second battery cell is at or above the predetermined value, the restrictor cross-section of the corresponding first or second restrictor may be reduced, thereby expanding the corresponding first or second coolant channel cross-sectional area.

The heat-sink may additionally include a first control plate fixed to the first coolant channel adjacent to the first restrictor and a second control plate fixed to the second coolant channel adjacent to the second restrictor. In such an embodiment, each of the first and second control plates may be configured to expand when the temperature of the associated first or second battery cell is at or above the predetermined value and contract when the temperature of the associated first or second battery cell is below the predetermined value. Accordingly, the first and second control plates thereby regulate the restrictor cross-section of the corresponding first or second restrictor projecting into the associated coolant channel.

Each of the first and second control plates may be fixed to the respective first or second coolant channel via an adhesive.

Each of the first and second control plates may be fixed to the respective first or second coolant channel via a friction weld.

Each of the first and second control plates may be constructed from a polymer, such as ABS plastic.

Each of the first and second coolant channels may be constructed from metal, such as steel or aluminum.

Each of the first and second coolant channel cross-sectional areas may be configured to selectively vary, between when the temperature of the associated first or second battery cell is below the predetermined value and when the temperature of the associated first or second battery cell is at or above the predetermined value, by at least 10%.

The battery module may also include a battery module enclosure surrounded by ambient environment and configured to house each of the first battery cell, the second battery cell, and the heat-sink.

The battery module may additionally include an insulating member arranged between the first battery cell and the second battery cell.

A motor vehicle having a power-source and the above-disclosed battery module configured to supply electric energy to the power-source is also disclosed.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Those having ordinary skill in the art will recognize that terms such as "above", "below", "upward", "downward", "top", "bottom", "left", "right", etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of a number of hardware, software, and/or firmware components configured to perform the specified functions.

Figure 1:
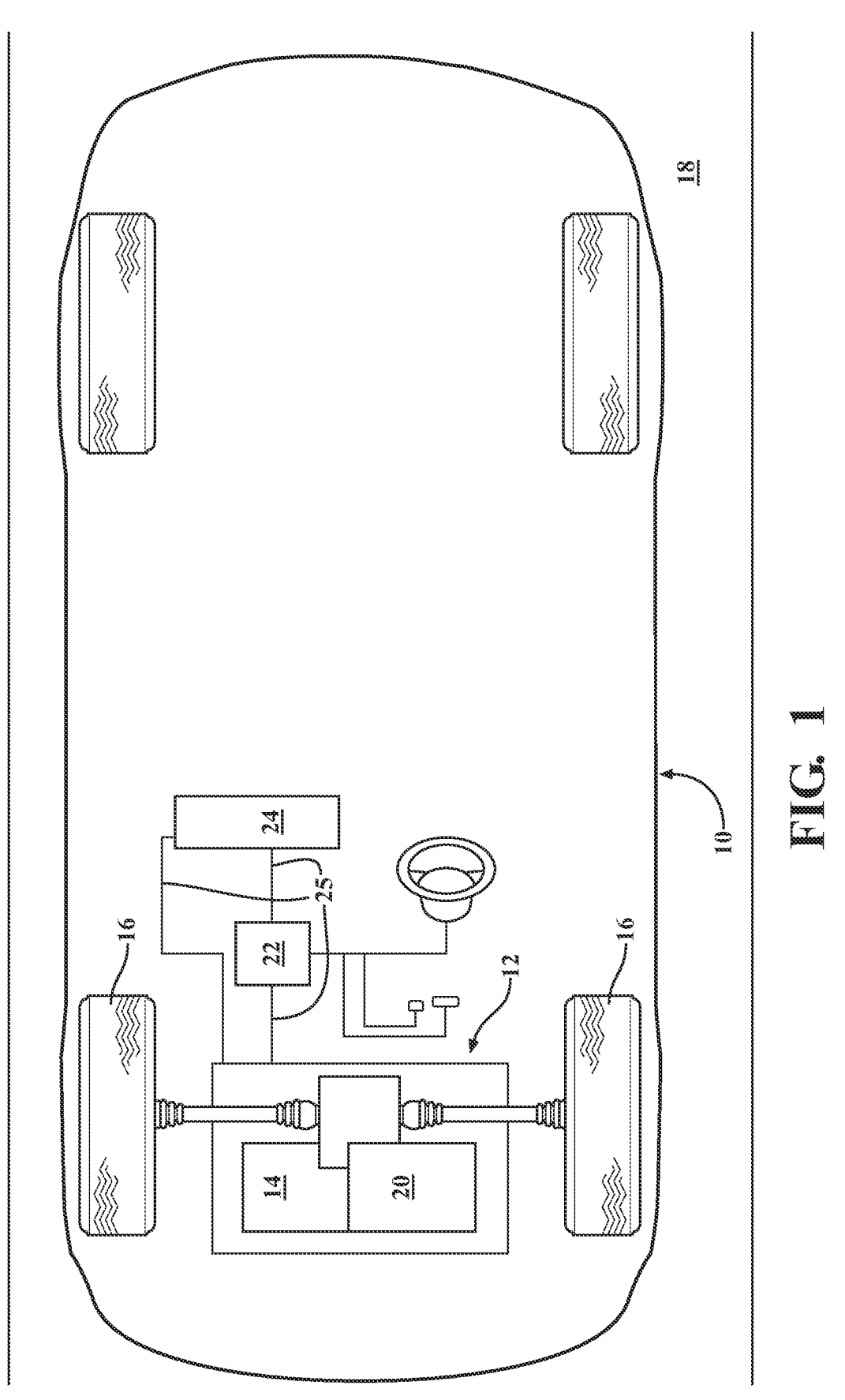
FIG. 1 is a schematic top view of an embodiment of a motor vehicle employing multiple power-sources and a battery system having battery cells configured to generate and store electrical energy, according to the disclosure.

Referring to FIG. 1, a motor vehicle 10 having a powertrain 12 is depicted. The vehicle 10 may include, but not be limited to, a commercial vehicle, industrial vehicle, passenger vehicle, aircraft, watercraft, train or the like. It is also contemplated that the vehicle 10 may be a mobile platform, such as an airplane, all-terrain vehicle (ATV), boat, personal movement apparatus, robot and the like to accomplish the purposes of this disclosure. The powertrain 12 includes a power-source 14 configured to generate a power-source torque for propulsion of the vehicle 10 via driven wheels 16 relative to a road surface 18. The power-source 14 is depicted as an electric motor-generator.

As shown in FIG. 1, the powertrain 12 may also include an additional power-source 20, such as an internal combustion engine. The power-sources 14 and 20 may act in concert to power the vehicle 10. The vehicle 10 additionally includes an electronic controller 22 and a battery system 24 configured to generate and store electrical energy through heat-producing electro-chemical reactions for supplying the electrical energy to the power-sources 14 and 20. The electronic controller 22 may be a central processing unit (CPU) that regulates various functions on the vehicle 10, or as a powertrain control module (PCM) configured to control the powertrain 12 to generate a predetermined amount of power-source torque T.

Figure 2:
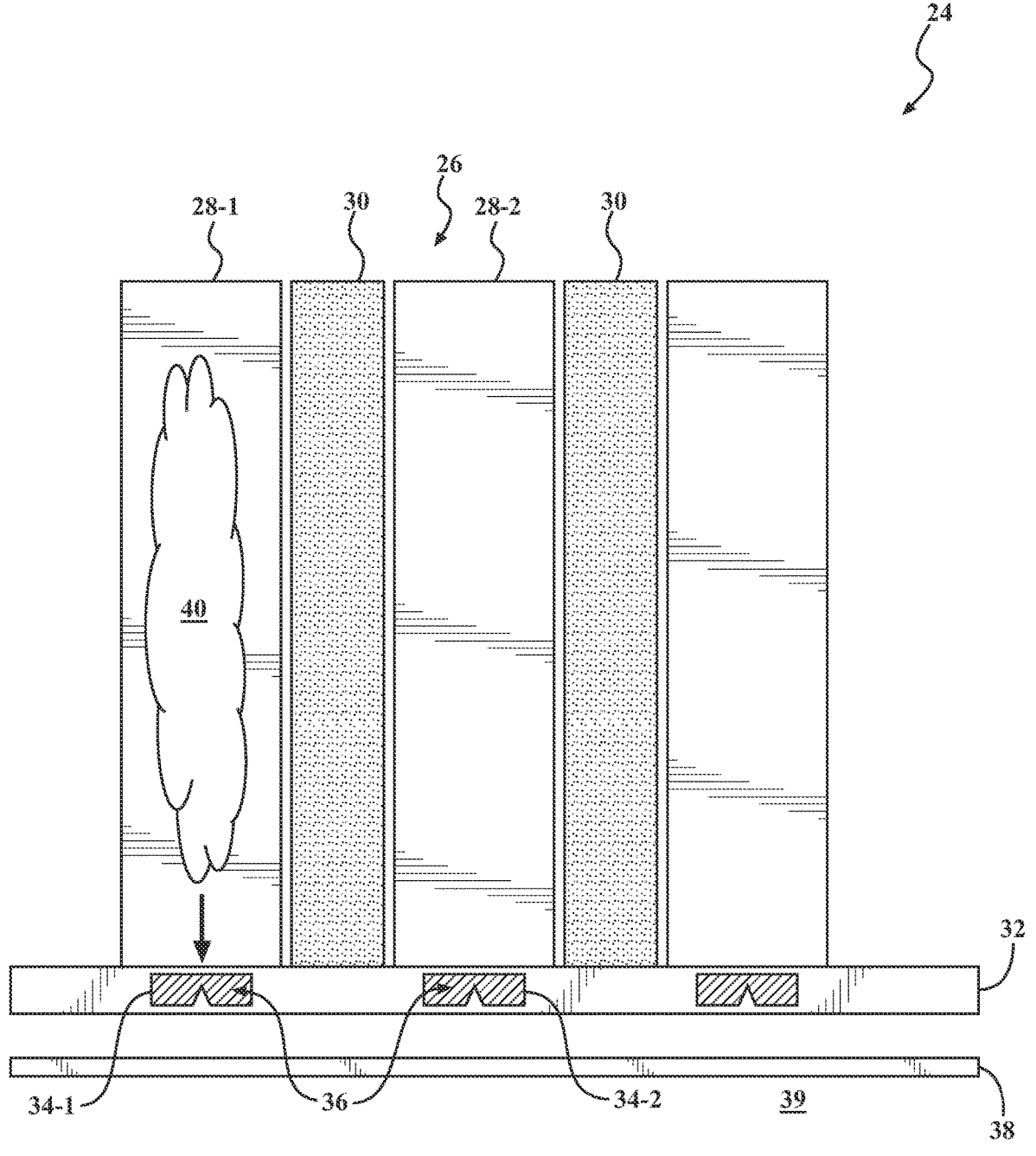
FIG. 2 is a schematic close-up cross-sectional plan view of the battery system shown in FIG. 1, having a heat-sink with a general representation of variable cross-sectional area coolant channels configured to mitigate thermal runaway in one of the battery cells, according to the disclosure.

The battery system 24 may be connected to the power-sources 14 and 20, the electronic controller 22, as well as other vehicle systems via a high-voltage BUS 25. As shown in FIG. 2, the battery system 24 may include one or more sections, such as a battery array or module 26. As shown in FIG. 2, the battery module 26 includes a plurality of battery cells, such as a first battery cell 28-1 and a neighboring, directly adjacent, second battery cell 28-2. Although one module 26 and two battery cells 28-1, 28-2 are shown, nothing precludes the battery system 24 from having a greater number of such modules and battery cells. The battery module 26 may also include an insulating member or pad 30 arranged between adjacent battery cells, such as the first battery cell 28-1 and the second battery cell 28-2. The insulating member 30 may be constructed from a high-temperature polymer foam configured to limit the amount of thermal energy transfer between the neighboring battery cells 28-1, 28-2. The insulating member 30 is also configured to maintain consistent and uniform contact with the first cell 28-1 and the second cell 28-2 during alternate expansion of the subject cells when charging and contraction of the cells when discharging.

As shown in FIG. 2, the battery module 26 also includes a heat-sink 32. The heat-sink 32 is in direct contact with each of the first battery cell 28-1 and the second battery cell 28-2 and thereby configured to absorb thermal energy from the first and second battery cells. As shown, the heat-sink 32 may be in direct physical contact with the first and second battery cells 28-1, 28-2. The heat-sink 32 is generally configured as a cold plate having a plurality of coolant channels, shown as respective first and second coolant channels 34-1 and 34-2 in FIGS. 2-4. The coolant channels 34-1, 34-2 are specifically configured to circulate a coolant 36 and thereby remove thermal energy from the first and second battery cells 28-1, 28-2 while the battery module 26 generates/stores electrical energy. Although one of the coolant channels 34-1, 34-2 is shown in the figures as employed for one of the battery cells 28-1, 28-2, nothing precludes one coolant channel from being used in the battery module 26 to remove thermal energy from a group of battery cells.

As shown in FIG. 2, the first coolant channel 34-1 may be arranged proximate, i.e., directly adjacent, (generally, either above or below) the associated first battery cell 28-1 and the second coolant channel 34-2 may be arranged proximate the associated second battery cell 28-2. Each of the first and second coolant channels 34-1, 34-2 may be constructed from thin-gauge sheet of metal, such as aluminum or steel. Specifically, material of the first and second coolant channels 34-1, 34-2 may be selected to have a relatively high rigidity and a comparatively high coefficient of thermal expansion. The battery module 26 also includes a battery module enclosure 38 surrounded by ambient environment 39 and configured to house each of the first battery cell 28-1, the second battery cell 28-1, the insulating member(s) 30, and the heat-sink 32.

Generally, during normal operation of the module 26, the insulating member 30 is effective in absorbing thermal energy released by the first and second cells 28-1, 28-2 and facilitating transfer of the thermal energy to the heat-sink 32. However, during extreme conditions, such as during a thermal runaway event (identified via numeral 40 in FIG. 2), the amount of thermal energy released by the cell undergoing the event will typically saturate the insulating member 30 and exceed its capacity to absorb and efficiently transfer heat to the heat-sink 32. As a result, excess thermal energy will typically be transferred between the neighboring cells 28-1, 28-2, leading to propagation of the thermal runaway through the module 26. The term "thermal runaway event" generally refers to an uncontrolled increase in temperature in a battery system. During a thermal runaway event, the generation of heat within a battery system or a battery cell exceeds the dissipation of heat, thus leading to a further increase in temperature within the module 26. A thermal runaway event may be triggered by various conditions, including a short circuit within the cell, improper cell use, physical abuse, manufacturing defects, or exposure of the cell to extreme external temperatures.

Figure 3:
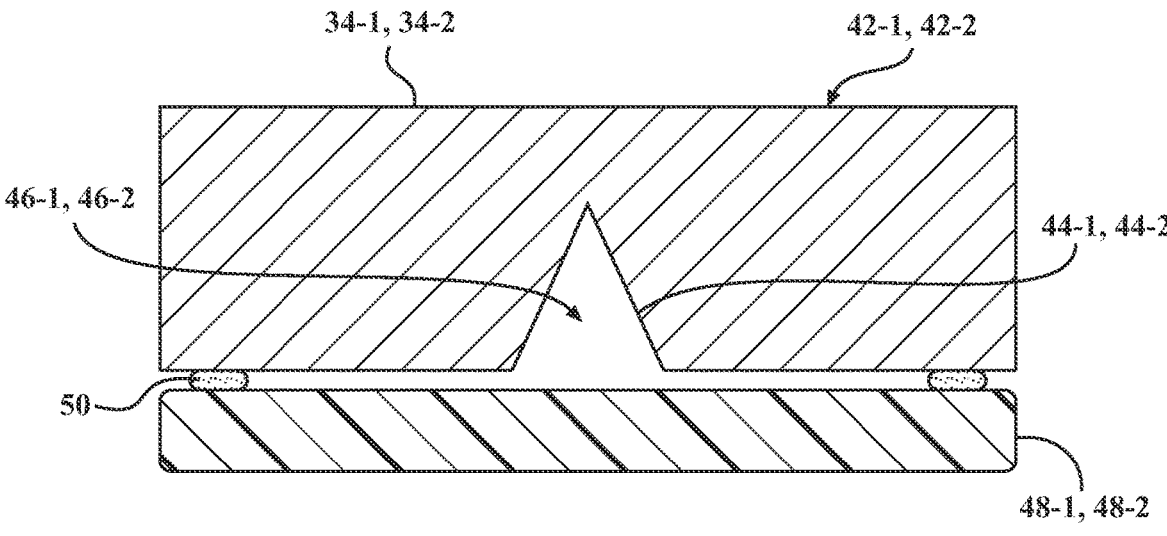
FIG. 3 is a schematic close-up cross-sectional partial plan view of the coolant channels shown in FIG. 2 including coolant channel restrictors and being fixed to control plates via an embodiment of attachment mechanism, additionally illustrating a state of coolant channel restrictor when temperature of the associated first or second battery cell is below the predetermined value, according to the disclosure.
Figure 4:
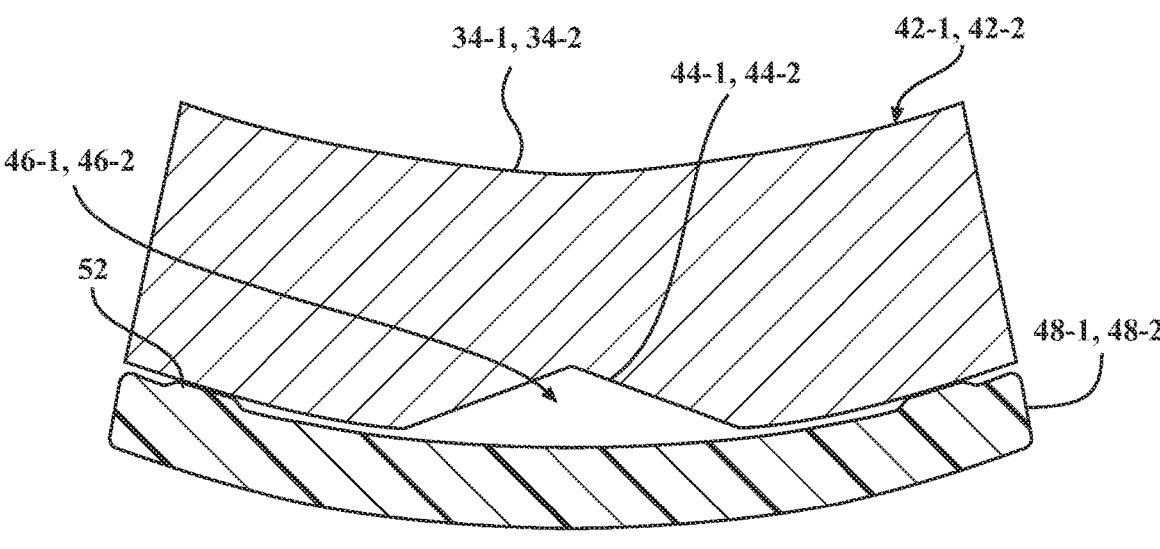
FIG. 4 is a schematic close-up cross-sectional partial plan view of the coolant channels shown in FIG. 2 including coolant channel restrictors and being fixed to control plates via another embodiment of attachment mechanism, additionally illustrating a state of coolant channel restrictor when temperature of the associated first or second battery cell is above the predetermined value, according to the disclosure.

As shown in a close-up cross-sectional view of the heat-sink 32 in FIG. 3, the first coolant channel 34-1 is defined by a first cross-sectional area 42-1, while the second coolant channel 34-2 is defined by a second cross-sectional area 42-2. Each of the first and second cross-sectional areas 42-1, 42-2 is configured to selectively vary in size in response to a change in temperature of the associated first or second battery cell 28-1, 28-2. Specifically, the first cross-sectional area 42-1 may be defined by a respective first obstructing or throttling restrictor 44-1 extending or projecting into the first coolant channel 34-1, while the second cross-sectional area 42-2 may be defined by a respective second restrictor 44-2 projecting into the second coolant channel 34-2. As shown in FIG. 3, the restrictors 44-1, 44-2 may have corresponding first restrictor cross-sectional area 46-1 and second restrictor cross-sectional area 46-2.

Each restrictor 44-1, 44-2 is configured to limit or narrow the respective first or second coolant channel cross-sectional area 42-1, 42-2 and thereby restrict the flow of coolant 36 through the corresponding coolant channel 34-1, 34-2 when a temperature of the corresponding first or second battery cell 28-1, 28-2 is below a predetermined or critical temperature value $t_c$. Such predetermined temperature value is intended to be indicative of the thermal runaway event occurring in the respective battery cells 28-1, 28-2. On the other hand, when the temperature of the first or second battery cell 28-1, 28-2 is at or above the critical temperature value $t_c$, size of the corresponding first or second restrictor 44-1, 44-2 (e.g., cross-sectional areas 46-1, 46-2) is reduced to thereby expand the corresponding first or second coolant channel cross-sectional area 42-1, 42-2. The selective variation of the first or the second cross-sectional area 42-1, 42-2 biases flow of the coolant 36 to a region of the heat-sink 32 proximate the corresponding first or the second battery cell 28-1, 28-2 experiencing a thermal runaway event. Such biasing of the cooling is intended to control propagation of the thermal runaway event to the other of the first and second battery cells 28-1, 28-2.

With continued reference to FIG. 3, the heat-sink 32 may also include a first control plate 48-1 fixed to the first coolant channel 34-1 adjacent to the first restrictor 44-1. The heat-sink 32 may additionally include a second control plate 48-2 fixed to the second coolant channel 34-2 adjacent to the second restrictor 44-2. Each of the first and second control plates 48-1, 48-2 may be constructed from a material having a comparatively low coefficient of thermal expansion, such as a polymer. For example, the first and second control plates 48-1, 48-2 may be formed from an acrylonitrile butadiene styrene (ABS) plastic. Each of the first and second control plates 48-1, 48-2 may be fixed to the respective first or second coolant channel 34-1, 34-2 via an adhesive 50 (shown in FIG. 3). Alternatively, each of the first and second control plates 48-1, 48-2 may be fixed to the respective first or second coolant channel 34-1, 34-2 via a friction weld 52 (shown in FIG. 4).

Each of the first and second control plates 48-1, 48-2 is configured to expand and bow away from the corresponding first and second coolant channels 34-1, 34-2 when the temperature of the associated first or second battery cell 28-1, 28-2 is at or above the critical temperature value $t_c$. Because of the attachment of the control plates 48-1, 48-2 to the first coolant channel 34-1, the bowing of the first and second control plates 48-1, 48-2 tends to spread the respective first and second restrictors 44-1, 44-2 and thereby reduce the size of the respective first and second restrictor cross-sectional areas 46-1, 46-2. Each of the first and second control plates 48-1, 48-2 is also configured to contract and straighten when the temperature of the associated first or second battery cell 28-1, 28-2 is below the critical temperature value $t_c$. Such contraction of the first and second control plates 48-1, 48-2 tends to tighten or narrow the respective first and second restrictors 44-1, 44-2 and thereby increase the size of the respective first and second restrictor cross-sectional areas 46-1, 46-2. Accordingly, the described action of the first and second control plates 48-1, 48-2 may thus regulate the size of the corresponding first or second restrictor cross-section 46-1, 46-2 projecting into the associated coolant channel 34-1, 34-2.

Each of the first and second coolant channel cross-sectional areas 42-1, 42-2 may be configured to selectively vary, between when the temperature of the associated first or second battery cell 28-1, 28-2 is below the critical temperature value $t_c$ and when the temperature of the associated battery cell is at or above the predetermined value, by at least 50%. The bowing of the first and second control plates 48-1, 48-2 may control the size of the respective first and second restrictor cross-sectional areas 46-1, 46-2 due to a difference in thermal expansion coefficient between materials of the subject control plates and the heat-sink coolant channels 34-1, 34-2. Material thicknesses of the coolant channels 34-1, 34-2 and the control plates 48-1, 48-2 may be selected and balanced to achieve the desired interaction and response to the critical temperature value $t_c$.

Overall, the design of the heat-sink 32 is configured to detect and automatically respond to a battery cell in a battery module having reached a predetermined temperature by varying a cross-sectional area of a coolant channel associated with the affected battery cell. The change of the coolant channel cross-sectional area may be regulated by the size of a corresponding restrictor 44-1, 44-2 which acts to redirect a portion of the coolant volume to a coolant channel proximate the battery cell affected by thermal runaway. Thus, the subject heat-sink 32 design is particularly effective in mitigating propagation of a thermal runaway within the battery module between individual battery cells, without requiring additional external hardware or controls.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. A battery module comprising:
a first battery cell and a neighboring second battery cell; and
a heat-sink configured to absorb thermal energy from the first and second battery cells and having:
a first coolant channel arranged proximate and associated with the first battery cell, configured to receive coolant, and defined by a first cross-sectional area; and
a second coolant channel arranged proximate and associated with the second battery cell, configured to receive coolant, and defined by a second cross-sectional area;
wherein each of the first and second coolant channel cross-sectional areas is configured to selectively vary in response to a change in temperature of the associated first or second battery cell, to thereby bias cooling to a region of the heat-sink proximate one of the first and second battery cells experiencing a thermal runaway event and control propagation of the thermal runaway event to the other of the first and second battery cells.

2. The battery module of claim 1, wherein:

when a temperature of the first battery cell or the second battery cell is below a predetermined value indicative of the thermal runaway event, the corresponding first or second coolant channel cross-sectional areas is defined by a respective first or second restrictor having a corresponding restrictor cross-section projecting into the associated coolant channel and thereby limiting the respective first or second coolant channel cross-sectional area; and when the temperature of the first battery cell or the second battery cell is at or above the predetermined value, the restrictor cross-section of the corresponding first or second restrictor is reduced, thereby expanding the corresponding first or second coolant channel cross-sectional area.

3. The battery module of claim 2, wherein:

the heat-sink additionally includes a first control plate fixed to the first coolant channel adjacent to the first restrictor and a second control plate fixed to the second coolant channel adjacent to the second restrictor; and each of the first and second control plates is configured to expand when the temperature of the associated first or second battery cell is at or above the predetermined value and contract when the temperature of the associated first or second battery cell is below the predetermined value, thereby regulating the restrictor cross-section of the corresponding first or second restrictor projecting into the associated coolant channel.

4. The battery module of claim 3, wherein each of the first and second control plates is fixed to the respective first or second coolant channel via an adhesive.

5. The battery module of claim 3, wherein each of the first and second control plates is fixed to the respective first or second coolant channel via a friction weld.

6. The battery module of claim 3, wherein each of the first and second control plates is constructed from a polymer.

7. The battery module of claim 3, wherein each of the first and second coolant channels is constructed from metal.

8. The battery module of claim 3, wherein each of the first and second coolant channel cross-sectional areas is configured to selectively vary, between when the temperature of the associated first or second battery cell is below the predetermined value and when the temperature of the associated first or second battery cell is at or above the predetermined value, by at least 10%.

9. The battery module of claim 1, further comprising a battery module enclosure surrounded by ambient environment and configured to house each of the first battery cell, the second battery cell, and the heat-sink.

10. A motor vehicle comprising:

a power-source configured to generate power-source torque; and a battery module configured to supply electrical energy to the power-source, the battery system including:

a first battery cell and a neighboring second battery cell; and a heat-sink configured to absorb thermal energy from the first and second battery cells and having:

a first coolant channel arranged proximate and associated with the first battery cell, configured to receive coolant, and defined by a first cross-sectional area; and a second coolant channel arranged proximate and associated with the second battery cell, configured to receive coolant, and defined by a second cross-sectional area;

wherein each of the first and second coolant channel cross-sectional areas is configured to selectively vary in response to a change in temperature of the associated first or second battery cell, to thereby bias cooling to a region of the heat-sink proximate one of the first and second battery cells experiencing a thermal runaway event and control propagation of the thermal runaway event to the other of the first and second battery cells.

11. The motor vehicle of claim 10, wherein:

when a temperature of the first battery cell or the second battery cell is below a predetermined value indicative of the thermal runaway event, the corresponding first or second coolant channel cross-sectional areas is defined by a respective first or second restrictor having a corresponding restrictor cross-section projecting into the associated coolant channel and thereby limiting the respective first or second coolant channel cross-sectional area; and when the temperature of the first battery cell or the second battery cell is at or above the predetermined value, the restrictor cross-section of the corresponding first or second restrictor is reduced, thereby expanding the corresponding first or second coolant channel cross-sectional area.

12. The motor vehicle of claim 11, wherein:

the heat-sink additionally includes a first control plate fixed to the first coolant channel adjacent to the first restrictor and a second control plate fixed to the second coolant channel adjacent to the second restrictor; and each of the first and second control plates is configured to expand when the temperature of the associated first or second battery cell is at or above the predetermined value and contract when the temperature of the associated first or second battery cell is below the predetermined value, thereby regulating the restrictor cross-section of the corresponding first or second restrictor projecting into the associated coolant channel.

13. The motor vehicle of claim 12, wherein each of the first and second control plates is fixed to the respective first or second coolant channel via an adhesive.

14. The motor vehicle of claim 12, wherein each of the first and second control plates is fixed to the respective first or second coolant channel via a friction weld.

15. The motor vehicle of claim 12, wherein each of the first and second control plates is constructed from a polymer.

16. The motor vehicle of claim 12, wherein each of the first and second coolant channels is constructed from metal.

17. The motor vehicle of claim 12, wherein each of the first and second coolant channel cross-sectional areas is configured to selectively vary, between when the temperature of the associated first or second battery cell is below the predetermined value and when the temperature of the associated first or second battery cell is at or above the predetermined value, by at least 10%.

18. The motor vehicle of claim 10, further comprising a battery module enclosure surrounded by ambient environment and configured to house each of the first battery cell, the second battery cell, and the heat-sink.

19. A battery module comprising:

a first battery cell and a neighboring second battery cell; and a heat-sink configured to absorb thermal energy from the first and second battery cells and having:

a first coolant channel arranged proximate and associated with the first battery cell, configured to receive coolant, and defined by a first cross-sectional area; and a second coolant channel arranged proximate and associated with the second battery cell, configured to receive coolant, and defined by a second cross-sectional area;

wherein:

each of the first and second coolant channel cross-sectional areas is configured to selectively vary in response to a change in temperature of the associated first or second battery cell, to thereby bias cooling to a region of the heat-sink proximate one of the first and second battery cells experiencing a thermal runaway event and control propagation of the thermal runaway event to the other of the first and second battery cells;

when a temperature of the first battery cell or the second battery cell is below a predetermined value indicative of the thermal runaway event, the corresponding first or second coolant channel cross-sectional areas is defined by a respective first or second restrictor having a corresponding restrictor cross-section projecting into the associated coolant channel and thereby limiting the respective first or second coolant channel cross-sectional area; and when the temperature of the first battery cell or the second battery cell is at or above the predetermined value, the restrictor cross-section of the corresponding first or second restrictor is reduced, thereby expanding the corresponding first or second coolant channel cross-sectional area.

20. The battery module of claim 19, wherein:

the heat-sink additionally includes a first control plate fixed to the first coolant channel adjacent to the first restrictor and a second control plate fixed to the second coolant channel adjacent to the second restrictor; and each of the first and second control plates is configured to expand when the temperature of the associated first or second battery cell is at or above the predetermined value and contract when the temperature of the associated first or second battery cell is below the predetermined value, thereby regulating the restrictor cross-section of the corresponding first or second restrictor projecting into the associated coolant channel.

\* \* \* \* \*